United States Patent Office 3,772,287
Patented Nov. 13, 1973

3,772,287
PYRRYLVINYLTHIAZOLIUM DERIVATIVES
Robert Beck Burrows, Ardsley, and Arthur Page Phillips, Tuckahoe, N.Y., assignors to Burroughs Wellcome Co., Research Triange Park, N.C.
No Drawing. Continuation of abandoned application Ser. No. 15,944, Mar. 2, 1970. This application Jan. 5, 1972, Ser. No. 215,691
Int. Cl. C09b 23/10
U.S. Cl. 260—240 E  14 Claims

ABSTRACT OF THE DISCLOSURE

Pyrrylvinylthiazolium salts of the following Formula (I)

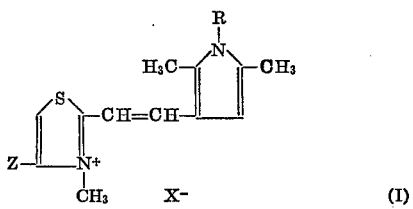

wherein R is an alkyl or an optionally substituted phenyl group; Z is phenyl, p-halophenyl, p-alkoxyphenyl, biphenylyl, p-alkoxybiphenylyl or naphthyl; and $X^-$ is the anion of a pharmaceutically acceptable acid.

The compounds are useful in having activity against parasitic nematodes infecting warm-blooded animals.

---

This is a continuation of U.S. application Ser. No. 15,944, filed on Mar. 2, 1970, now abandoned.

This invention relates to quaternary ammonium salts, their synthesis, pharmaceutical compositions containing them, and their use as therapeutic agents.

The present invention provides compounds of Formula (I)

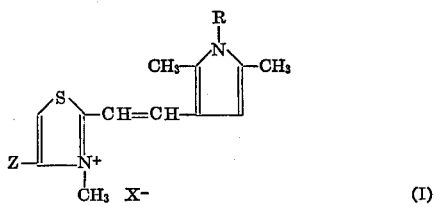

wherein R is alkyl or is an optionally substituted phenyl group; Z is phenyl, p-halophenyl, p-alkoxyphenyl, biphenylyl, p-alkoxybiphenylyl or naphthyl; and $X^-$ is the anion of a pharmaceutically acceptable acid.

The compounds of Formula I have been found active against parasitic nematodes, especially pinworms, although the compounds also have activity against other nematodes such as whipworms, hookworms, etc. Thus they have been found active against *Syphacia obvelata* in mice, a screening organism for the human pinworm, *Enterobius vermicularis*, both organisms having similar life-cycles. Also, they have activity against *Aspiculuris tetraptera* in mice.

Most important, the compounds have high $LD_{50}$ doses which, together with their good anthelmintic activities at low doses, gives them a high therapeutic index.

The compounds in which Z is biphenylyl are particularly preferred. Other preferred compounds are those in which Z is p-alkoxyphenyl, the alkoxy having 1 to 6 carbon atoms, that is methoxy to hexoxy. When R is an alkyl group, it has 1 to 6 carbon atoms, that is methyl to hexyl. When R is a phenyl group, it may be substituted by one or more groups such as halogen (that is, chlorine, bromine, fluorine and iodine); alkyl having 1 to 4 carbon atoms (methyl to butyl); or alkoxy having 1 to 4 carbon atoms (methoxy to butoxy). When Z is p-alkoxybiphenylyl, the alkoxy has 1 to 6 carbon atoms (methoxy to hexoxy).

Examples of particularly valuable compounds of Formula I are:

2-{β-(1-n-butyl-2,5-dimethyl-3-pyrryl)vinyl}-4-(p-bromophenyl)thiazole methiodide;
2-{β-(1-n-butyl-2,5-dimethyl-3-pyrryl)vinyl}-4-(p-methoxyphenyl)thiazole methiodide;
2-{β-(1-n-butyl-2,5-dimethyl-3-pyrryl)vinyl}-4-(p-chlorophenyl)thiazole methiodide;
2-{β-(1-n-butyl-2,5-dimethyl-3-pyrryl)vinyl}-4-phenylthiazole methiodide;
2-{β-(1-n-amyl-2,5-dimethyl-3-pyrryl)vinyl}-4-phenylthiazole methiodide;
2-{β-(1-n-amyl-2,5-dimethyl-3-pyrryl)vinyl}-4-(p-chlorophenyl)thiazole methiodide;
2-{β-(1-phenyl-2,5-dimethyl-3-pyrryl)vinyl}-4-(p-bromophenyl)thiazole methiodide;
2-{β-(1-n-amyl-2,5-dimethyl-3-pyrryl)vinyl}-4-(p-bromophenyl)thiazole methiodide;
2-{β-(1,2,5-trimethyl-3-pyrryl)vinyl}-4-(p-bromophenyl)thiazole methiodide;
2-{β-(1,2,5-trimethyl-3-pyrryl)vinyl}-4-(p-chlorophenyl)thiazole methiodide;
2-{β-(1,2,5-trimethyl-3-pyrryl)vinyl}-4-β-naphthylthiazole methiodide;
2-{β-(1,2,5-trimethyl-3-pyrryl)vinyl}-4-p-biphenylylthiazole methiodide;
2-{β-(1-p-chlorophenyl-2,5-dimethyl-3-pyrryl)vinyl}-4-p-biphenylylthiazole methiodide;
2-{β-(1-phenyl-2,5-dimethyl-3-pyrryl)vinyl)-4-p-biphenylylthiazole methiodide;
2-{β-(1-ethyl-2,5-dimethyl-3-pyrryl)vinyl)-4-p-biphenylthiazole methiodide;
2-{β-(1-phenyl-2,5-dimethyl-3-pyrryl)vinyl}-4-phenylmethiodide; and
2-{β-(1-ethyl-2,5-dimethyl-3-pyrryl)vinyl}-4-phenylthiazole methiodide; and
2-{β-(1,2,5-trimethyl-3-pyrryl)vinyl}-4-phenylthiazole methiodide.

Unless otherwise indicated, references in the specification and claims to pyrrylvinylthiazolium salts of Formula I mean salts of a pharmaceutically acceptable acid.

The compounds of Formula I may be made by any method known for preparing compounds of an analogous chemical structure. Thus, they may be prepared by the reaction of a thiazolium compound of the Formula II

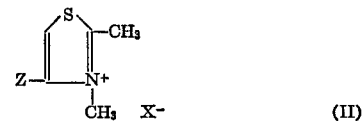

with an aldehyde of the Formula III

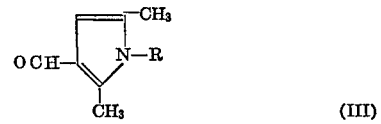

wherein Z, R and $X^-$ are as defined above. The reaction is preferably carried out in the presence of a basic catalyst such as piperidine, but other bases of comparable or greater basic strength may be used, for example, amines (pyrrolidine, N-methylpyrrolidine) or an alkali metal hydroxide or an alkoxide. The reaction is conveniently carried out in the presence of a liquid medium which is, or contains, a polar liquid, in which the reactants may be dissolved or suspended in a finely divided form. The liquid medium for the reaction is preferably a lower alcohol (optionally containing water) such as methanol or ethanol, or may be some other polar medium not reactive to the reactants such as dimethyl sulphoxide or sulfolane. The reaction is preferably conducted at a temperature from 20° C. to the boiling point of the reaction mixture.

The intermediate 2,3-dimethyl-4-Z-thiazolium salts of Formula II may be prepared by the following sequence of reactions, the last step providing for the quaternisation of the 2-methyl-4-Z-thiazole of Formula VI by a methyl derivative $CH_3A$:

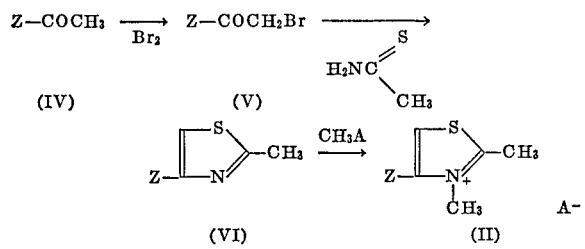

where the symbol Z has the meanings given above, and A is a nucleophilic group or atom, for example, chlorine, bromine, or iodine, or a methosulphate, or p-toluenesulphonate group.

The compounds of Formula I may also be prepared by the reaction of a phenacyl derivative of Formula VII with a thioamide of Formula VIII

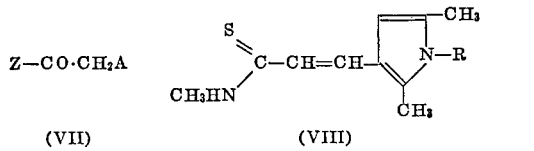

wherein Z, R and A are as defined above. This reaction proceeds via an intermediate thioimidate of Formula IX

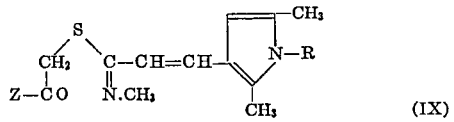

wherein Z and R are as defined above, and this thioimidate itself, if desired, may be isolated and then converted to a compound of Formula I as described below. The compounds of Formula I are formed by the reaction of the phenacyl derivative of Formula VII and the thioamide of Formula VIII under conditions which convert the thioimidate intermediate (IX) to a compound of Formula I. In general, heating the reactants, or reacting them in the presence of an acid, will tend to form the compounds of Formula I. A temperature of 80° to 150° C. is conveniently employed to effect a rapid conversion to the compounds of Formula I. The acid may be a mineral acid such as hydrochloric or hydrobromic acid and preferably corresponds to the nucleophilic group or atom A which provides the anion $X^-$ of Formula I. The reaction is preferably performed in the presence of a polar liquid medium, for example, a lower alkanol such as ethanol or butanol, or a water/butanol mixture. The optimum reaction conditions for forming the compounds of Formula I vary according to the nature of the thioimidate intermediate, the group A and the liquid medium employed.

The thioimidates of Formula IX and their acid addition salts may themselves be converted to the compounds of Formula I by treatment with an acid, preferably a mineral acid, for example, hydrochloric or hydrobromic acid, which should preferably correspond to the thioimidate salt, if used, and to the desired thiazolium salt of Formula I. The acid addition salts of the thioimidates of Formula IX may also be converted to the compounds of Formula I by heating the salts, preferably the hydrochloric or hydrobromic acid addition salts. The reaction is preferably conducted in a polar liquid medium, for example, a lower alkanol such as butanol, conveniently at a temperature of 80° to 150° C.

The activity against nematodes of the compounds of Formula I resides in the cation, and the nature of the anion $X^-$ is unimportant providing that the salt is pharmaceutically acceptable. Examples of suitable salts are the halides, sulphonates, sulphates and alkyl sulphates. The iodide, methosulphate and p-toluenesulphonate salts are preferred since they can be conveniently introduced in the quaternisation step by the use of methyl iodide, dimethylsulphate and methyl p-toluenesulphonate. The bromide salts may be prepared by the use of methyl bromide. Other salts may be prepared by conventional procedures, for example, by replacing the anion by double decomposition of either the 2,3-dimethyl-4-Z-thiazolium salt or the 2-(R-2,5-dimethyl-3-pyrryl)-3-methyl-4-Z-thiazolium salt. For example, the chloride salts may be prepared from the iodide salts by shaking the latter with silver chloride in alkanolic solution; and the chloride and bromide salts may be converted to the iodide salts by reaction with potassium iodide, either before or after their isolation from the reaction mixture.

For the treatment of nematode infections in warm-blooded animals, the compounds of Formula I are conveniently administered in pharmaceutical compositions comprising the compounds and an acceptable carrier therefor. Any well known type of pharmaceutical composition may be used for this purpose, but compositions for oral use are preferred. For administration of the compounds of Formula I in dry solid form, they may be presented as capsules, granules, pills, powders, tablets, boluses, or in a gelatin cube, containing the desired amount of the compound distributed in such carriers as are usually employed. The compositions are prepared in general by intimately and uniformly mixing the active ingredient with the carrier which may comprise one or more diluents, fillers, disintegrating agents and binders. Boluses and tablets may be compounded by techniques well known in the art, for example, by compression on a tabletting machine. The tablets may be formed so as to disintegrate rapidly, or to provide a prolonged or delayed action, or to provide a predetermined release of the active ingredient at successive intervals. The tablets also may be coated. Capsules are readily prepared by combining the active ingredient with any desired excipient and filling into the capsule.

The compounds of Formula I may also be administered in a liquid preparation or as a component of the feed of the animal. Liquid preparations may comprise a suspension or solution of the active ingredient in water or in a vegetable or mineral oil or an emulsion thereof. The liquid carrier itself may consist of one or more ingredients, for example, liquid diluents, buffers, bacteriostats, sweeteners, colouring matter, dispersing agents, suspending agents and emulsifiers.

The normal unit dose range for the compounds of Formula I is from 5 to 100 mg. cation/kg. body weight of the animal being treated. The preferred unit dose range is 5 to 25 mg./kg.

The invention thus also provides a method for the preparation of the compounds of Formula I hereinbefore described.

The invention therefore further provides a method for the treatment of a nematode infection in warm-blooded animals or mammals (for example dogs, cats and humans) comprising the administration (preferably oral) of an effective amount of a compound of Formula I to the host of the infection. It also provides a pharmaceutical composition comprising a compound of Formula I together with a pharmaceutically acceptable carrier therefor, and a method of preparing such a composition by admixture of the components.

The invention also provides a pharmaceutical composition for use as an anthelmintic which comprises essentially an effective amount of a compound of Formula I in combination with a pharmaceutically acceptable carrier therefor.

The following examples illustrate the invention. All temperatures are in degrees Celsius.

EXAMPLE 1

2-{(β-1-phenyl-2,5-dimethyl-3-pyrryl(vinyl)}-4-(p-biphenylyl)thiazole methiodide p-Phenylphenacyl bromide (27.5 g., 0.1 M) and thioacetamide (10 g., 0.13 M) were mixed and heated in methanol (150 ml.). The reaction mixture developed a strong acidic reaction almost at once. After heating at 100° for 1–2 hours, a part of the methanol was evaporated and water and ammonia were added, thus precipitating the thiazole base. This was collected and purified by recrystallisation from methanol and gave colourless crystals of 2-methyl-4-p-biphenylyl thiazole (23 g., 90–95% yield) melting at 120–121° C.

A solution of 2-methyl-4-p-biphenylyl thiazole (25 g., 0.1 M) and methyl iodide (22 g.) in dimethylformamide (70 ml.) was heated for 6–8 hours at 100° C. Upon addition of excess ether and cooling, there was obtained 2-methyl - 4-(p-biphenylyl)thiazole methiodide (30–32 g., 75–80%). After purification by digesting with hot methanol, this compound had a melting point of 272–273° C.

To a mixture of 2 - methyl-4-(p-biphenylyl)thiazole methiode (7.9 g., 0.02 M) and 1-phenyl-2,5-dimethylpyrrole-3-carboxaldehyde (4.8 g., 0.024 M) in methanol (16 cc.) was added piperidine (2 cc.). The reaction mixture was heated on a steam bath for 3 hours. An orange condensation product was formed within a few minutes. The longer heating period was employed because of the relative insolubility of both the starting compound (thiazole methiodide) and the product, in order to ensure nearly compelte transformation of this insoluble reactant into the insoluble product.

After filtration and washing with methanol and ether, 2-{β-(1-phenyl-1,5-dimethyl-3-pyrryl)vinyl}-4-(p-phenylyl)thiazole methiodide was obtained. After further digestions with hot methanol an orange product melting at 216–218° C. was obtained.

1 - phenyl - 2,5-dimethylpyrrole-3-carboxaldehyde was prepared as follows. Aniline (19 g. 0.2 M), acetonylacetone (23 g. 0.2 M) and glacial acetic acid (2 cc.) were mixed and heated for a half to one hour on a steam bath. Upon cooling white crystals formed which were recrystallised from ethanol to give 2,5-dimethyl-1-phenylpyrrole (31 to 33 g. 95%+yield) melting at 51 to 52° C.

To dimethylformamide (32 cc., 0.4 M±) chilled in an ice bath, phosphorus oxycholride (15.3 g., 0.1 M) (9 cc.) was gradually added. To this cooled mixture, 2,5-dimethyl-1-phenylpyrrole (17 g., 0.1 M) was added carefully and the reaction mixture was removed from the ice bath and was heated for 2 hours at 100° C. (steam bath). The mixture was then poured on to one hundred to two hundred grams of ice. The aqueous ice mixture was basified to pH 11 with 50% aqueous sodium hydroxide and gave white crystals of the aldehyde product. This was collected and recrystallised from ethanol giving 18 grams (90%) yield of purified aldehyde, melting point 90–91° C.

EXAMPLE 2

By the method of Example 1 the following compounds were prepared.

2-(β-(1-n-butyl-2,5-dimethyl-3-pyrryl)vinyl)-4-(p-bromophenylthiazole methiodide M.P. 181–182° C.;

2-(β-(1-n-butyl-2,5-dimethyl-3-pyrryl)vinyl)-4-(p-methoxyphenyl)thiazole methiodide M.P. 148–49° C.;

2-(β-(1-n-butyl-2,5-dimethyl-3-pyrryl)vinyl)-4-(p-chlorophenyl)thiazole methiodide M.P. 169–170° C.;

2-(β-(1-n-butyl-2,5-dimethyl-3-pyrryl)vinyl)-4-phenylthiazole methiodide M.P. 182–183° C.;

2-(β-(1-n-amyl-2,5-dimethyl-3-pyrryl)vinyl-4-phenylthiazole methiodide M.P. 108–109° C.;

2-(β-(-n-amyl-2,5-dimethyl-3-pyrryl)vinyl)-4-(p-chlorophenyl)thiazole methiodide M.P. 181–182° C.;

2-(β-(1-phenyl-2,5-dimethyl-3-pyrryl)vinyl)-4-(p-bromophenyl)thiazole methiodide (monohydrate) M.P. 222–23° C.;

2-(β-(1-n-amyl-2,5-dimethyl-3-pyrryl)vinyl)-4-(p-bromophenyl)thiazole methiodide (hemihydrate) M.P. 175–176° C.;

2-(β-(1,2,5-trimethyl-3-pyrryl)vinyl)-4-(p-bromophenyl) thiazole methiodide M.P. 228–229° C.;

2-(β-(1,2,5-trimethyl-3-pyrryl)vinyl)-4-(p-chlorophenyl)thiazole methiodide M.P. 229–230° C.

2-(β-(1,2,5-trimethyl-3-pyrryl)vinyl)-4-β-naphthylthiazole methiodide, M.P. 221–222° C.;

2-(β-1,2,5-trimethyl-3-pyrryl)vinyl)-4-p-biphenylthiazole methiodide (hemihydrate) M.P. 222–223° C.;

2-(β-(1-p-chlorophenyl-2,5-dimethyl-3-pyrryl)vinyl)-4-p-biphenylthiazole methiodide M.P. 227–228° C.;

2-(β-(1-ethyl-2,5-dimethyl-3-pyrryl)vinyl)-4-p-biphenylylthiazole methiodide (hydrate) M.P. 192–193° C.;

2-(β-(1-phenyl-2,5-dimethyl-3-pyrryl)vinyl)-4-phenylthiazole methiodide M.P. 223–224° C.;

2-(β-(1-ethyl-2,5-dimethyl-3-pyrryl)vinyl)-4-phenylthiazole methiodide M.P. 208–210° C.;

2-(β-1,2,5-trimethyl-3-pyrryl)vinyl)-4-phenylthiazole methiodide M.P. 228–230° C.;

EXAMPLE 3

2-(β-(1-phenyl-2,5-dimethyl-3-pyrryl)vinyl)-3-methyl-4-p-biphenylylthiazolium bromide A solution of chloroacetmethylamide (Jacobs and Heidelberger, J. Biol. Chem., 1915, 21, 145) (53.75 g.) and triphenylphosphine (144 g.) in benzene (125 ml.) was heated in a bath at 100° for 24 hours. The solid was collected and washed with benzene. This N-methylcarbamoylmethyl-triphenylphosphonium chloride had M.P. 252° (efferv.).

To a stirred ice-cold solution of this phosphonium salt (18.5 g.) and 2,5-dimethyl-1-phenylpyrrole-3-aldehyde (9.95 g.) in methanol (100 ml.) was added slowly a solution of sodium methoxide prepared by dissolving sodium (1.25 g.) in methanol (50 ml.). The mixture was stirred for a further 1 hour at room temperature, water was added and most of the methanol was evaporated. The residual mixture was extracted with ether, and the ether extract was washed with water, dried and evaporated. The residue was dissolved in methanol and allowed to crystallise. The resulting 3-(2,5-dimethyl - 1 - phenylpyrrol-3-yl) acrylomethylamide formed colourless prisms of a hydrate (M.P. 85–90°) which on drying gave the anhydrous amide, M.P. 157–158°.

The foregoing amide (6.4 g.) was dissolved in pyridine (50 ml.), phosphorus pentasulphide (3 g.) was added and the mixture was refluxed with mechanical stirring for 30 minutes. The mixture was poured into water and the insoluble oil was extracted with chloroform, and the extract was dried and evaporated. The residue was purified by chromatography on alumina in chloroform solution to give 3-(2,5-dimethyl - 1-phenylpyrrol - 3 - yl)acrylothiomethylamide as a yellow glassy material.

A solution of the thioamide (2 g.) and p-phenylphenacyl bromide (2.05 g.) in acetone (20 ml.) was refluxed for 2 hours. The bright yellow solid which had come out of solution was collected. This p-phenylphenacyl-N-methyl-3-(2,5-dimethyl-1-phenylpyrrol-3-yl)acrylthioimidate hydrobromide had M.P. 165° (efferv.), unchanged by recrystallisation from ethanol ether.

The above thioimidate hydrobromide (1 g.) was heated on the steam-bath with hydrobromic acid (5 ml. of 47%) for 25 minutes. The cooled mixture was diluted with water and neutralised by addition of sodium hydroxide solution The solid was collected and recrystallised from ethanol to give light brown prisms, M.P. 202° (efferv.), of 2-{β-(1-phenyl-2,5-dimethyl-3-pyrryl)vinyl}-3-methyl - 4 - p - biphenylthiazolium bromide.

Treatment of a methanolic solution of the bromide with aqueous potassium iodide gave the corresponding iodide, M.P. 216° (decomp.)

EXAMPLE 4

2-{β-(1,2,5-trimethyl-3-pyrryl)vinyl}-3-methyl-4-p bromophenylthiazolium bromide (a) From 1,2,5-trimethylpyrrole-3-aldehyde and N-methylcarbamoylmethyltriphenylphosphonium chloride, under the conditions described in Example 3, was prepared 3-(1,2,5-trimethylpyrrol - 3 - yl)acrylomethylamide which crystallised from methanol in colourless prisms, M.P. 214–216°.

By treatment with phosphorus pentasulphide in pyridine solution as described in Example 3, the amide was converted to 3-(1,2,5-trimethylpyrrol - 3 - yl)acrylothiomethylamide, crystallising from methanol in bright yellow plates, M.P. 153–154°.

A solution of this thioamide (1.04 g.) and p-bromophenacyl bromide (1.4 g.) in acetone (20 ml.) was boiled under reflux. The yellow solid which soon came out of solution was collected after 1 hour, and recrystallised from methanol to give deep yellow prisms, M.P. 180° (decomp.), of p-bromophenacyl-N-methyl-3-(1,2,5-trimethylpyrrol-3-yl) acrylothioimidate hydrobromide.

This thiohydrobromide (1 g.) in methanol (25 ml.) and hydrobromic acid (2.5 ml. of 47%) was boiled for 15 minutes. On cooling, the solution deposited deep yellow prisms, M.P. 216° (decomp.), of 2-{β-(1,2,5-trimethyl-3-pyrryl)vinyl}-3-methyl-4-p-bromophenyl thiazolium bromide.

The corresponding iodide, prepared from the bromide using potassium iodide solution, had M.P. 228° (decomp.).

(b) A solution of 3-(1,2,5-trimethylpyrrol-3-yl)acrylothiomethylamide (1.04 g.) and p-bromophenacyl bromide (1.4 g.) in ethanol (30 ml.) containing hydrobromic acid (0.5 ml. of 47%) was refluxed for 1¼ hours. The dark solution was cooled, and the crystals were collected and recrystallised from methanol to give deep yellow prisms, M.P. 216° (decomp.), of 2-{β-(1,2,5-trimethyl-3-pyrryl)vinyl}-3-methyl-4-p-bromophenyl thiazolium bromide.

EXAMPLE 5

A tablet was made from the following ingredients:

|   | Mg. |
|---|---|
| (i) 2 - {β-(1-Phenyl-2,5-dimethyl-3-pyrryl)vinyl)-4-p-biphenylylthiazole methiodide (calculated as the base) | 250 |
| (ii) Lactose B.P. | 100 |
| (iii) Starch B.P. | 50 |
| (iv) Gelatin | 8 |
| (v) Magnesium stearate B.P. | 5 |

Ingredients (i), (ii) and half of (iii) were admixed and granulated with a solution of (iv) in 50% (v./v.) aqueous ethanol. The remainder of (iii) and the magnesium stearate (v) were added to the dried granules and the mixture compressed to form tablets.

EXAMPLE 6

A paediatric suspension, containing 2-{β-(1-phenyl-2,5-dimethyl-3-pyrryl)vinyl}-4 - p - biphenylylthiazole methiodide equivalent to 50 mg. base in each 5 ml., was prepared from the following ingredients:

| (i) 2-{β-(1-phenyl-2,5-dimethyl - 3 - pyrryl)vinyl}-4-p-biphenylylthiazole methiodide equivalent to 50 mg. base/5 ml. | | |
|---|---|---|
| (ii) Compound tragacanth powder B.P. | g | 4.0 |
| (iii) Syrup B.P | ml | 20.0 |
| (iv) Glycerin B.P. | ml | 5.0 |
| (v) Methyl Hydroxybenzoate B.P. | g | 0.1 |
| (vi) Purified water B.P. to 100.0 ml. | | |

A paste was prepared of (i) and (ii) using (iii) and (iv). Ingredient (v) was dissolved in the greater part of (vi), using heat, and the solution used to dilute the paste previously prepared. The volume of the resultant suspension was adjusted using the rest of the purified water.

What we claim is:

1. A salt of the 2-[β-(1-ethyl-2,5-dimethyl-3-pyrryl)vinyl] - 3 - methyl-4-p-biphenylthiazolium cation with the anion of a pharmaceutically acceptable acid.

2. A salt of the 2-[β-(1-phenyl-2,3-dimethyl-3-pyrryl)vinyl] - 3 - methyl-4-p-biphenylthiazolium cation with the anion of a pharmaceutically acceptable acid.

3. A salt of the 2-[β-(1-p-chlorophenyl-2,3-dimethyl-3 - pyrryl)vinyl]-3-methyl-4-p-biphenylthiazolium cation with the anion of a pharmaceutically acceptable, acid.

4. A salt according to claims 5, 6, 7 and 2 wherein the anion is iodide.

5. 2 - [β - (1 - phenyl - 2,5-dimethyl-3-pyrryl)vinyl]-3-methyl-4-p-biphenylythiazolium iodide.

6. A compound of the formula

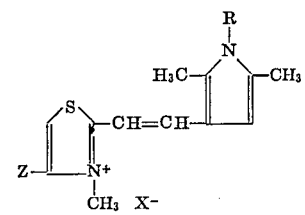

where R is selected from the class consisting of alkyl having 1 to 6 carbon atoms, phenyl and phenyl substituted with one or more halogen, alkyl groups having 1 to 4 carbon atoms, or alkoxy groups having 1 to 4 carbon atoms; Z is selected from the class consisting of biphenylyl, p-alkoxybiphenylyl where the alkoxy has 1 to 6 carbon atoms, and naphthyl; and X⁻ is the anion of a pharmaceutically acceptable acid.

7. A compound according to claim 6 wherein R is alkyl of 1 to 6 carbon atoms.

8. A compound according to claim 6 wherein Z is p-biphenylyl.

9. A compound according to claim 7 wherein Z is p-biphenyl.

10. A compound according to claim 9 wherein Z is napthyl.

11. A compound according to claim 7 wherein Z is naphthyl.

12. A compound according to claim 6 wherein R is phenyl.

13. A salt of the 2-[β-(1,2,5-trimethyl-3-pyrryl)vinyl]-3-methyl-4-(p-chlorophenyl)thiazolium cation with the anion of a pharmaceutically acceptable acid.

14. A salt of the 2-[β-(1-phenyl-2,5-dimethyl-3-pyrryl)vinyl] - 3 - methyl-4-(p-bromophenyl)thiazolium cation with the anion of a pharmaceutically acceptable acid.

References Cited

UNITED STATES PATENTS 3,598,595   8/1971   Mee et al. _____ 260—240 E X

JOHN D. RANDOLPH, Primary Examiner

U.S. Cl. X.R.

260—302 R, 326.5 J, 326.9; 424—270

PO-1050
(5/69)

UNITED STATES PATENT OFFICE
CERTIFICATE OF CORRECTION

Patent No. 3,772,287  Dated NOVEMBER 13, 1973

Inventor(s) ROBERT BECK BURROWS, and ARTHUR PAGE PHILIPS

It is certified that error appears in the above-identified patent and that said Letters Patent are hereby corrected as shown below:

Foreign Application Priority Data

March 7, 1969  Great Britain  ..........12.158

Signed and sealed this 15th day of October 1974.

(SEAL)
Attest:

McCOY M. GIBSON JR.
Attesting Officer

C. MARSHALL DANN
Commissioner of Patents